United States Patent [19]

Lambert

[11] 4,299,079
[45] Nov. 10, 1981

[54] MACHINE FOR RAKING OR SWEEPING

[76] Inventor: Phillip E. Lambert, Rte. #2, Zimmerman, Minn. 55398

[21] Appl. No.: 155,396

[22] Filed: Jun. 2, 1980

[51] Int. Cl.³ .............................................. A01D 7/02
[52] U.S. Cl. .................................. 56/16.7; 56/400.14
[58] Field of Search ........... 56/400.09, 400.13, 400.14, 56/400.02, 400.03, 16.7, 16.4

[56] References Cited

U.S. PATENT DOCUMENTS

| | | | |
|---|---|---|---|
| 3,417,554 | 12/1968 | Sudhoff | 56/16.7 |
| 3,777,460 | 12/1973 | Mokros | 56/16.7 |
| 3,789,590 | 2/1974 | Wilson | 56/16.7 |
| 3,824,773 | 7/1974 | Brubaker | 56/16.7 |
| 3,921,373 | 11/1975 | Rubin | 56/16.7 |
| 4,009,560 | 3/1977 | Wells | 56/400.14 |

*Primary Examiner*—Paul J. Hirsch
*Attorney, Agent, or Firm*—Peterson, Palmatier, Sturm & Sjoquist

[57] ABSTRACT

A pair of laterally spaced, upwardly extending arms are pivotally attached at their lower ends to the sides of a wheeled frame for oscillatory movement about a horizontal axis. A transverse member is pivotally connected to the upper ends of the arms. A trio of rearwardly and downwardly extending arms are secured at laterally spaced locations to the transverse member and are oscillatable about an elevated horizontal axis, each of the last-mentioned arms having a sweeping unit in the form of a lawn rake or bristled broom attached to its rear or free end. Still another arm extends forwardly from the transverse member and has its forward end pivotally connected to a power-operated crank. As the machine is moved across the surface to be swept, as when raking a lawn, the rakes are repeatedly dragged forwardly, raised and then lowered so as to form a windrow of leaves and other debris. The movement of the rakes or brooms is at a much faster rate than the machine is pushed so that the ground is effectively raked or swept. A clutch arrangement permits the raking of sweeping movement to be halted at any time under the control of the walk-behind operator.

10 Claims, 8 Drawing Figures

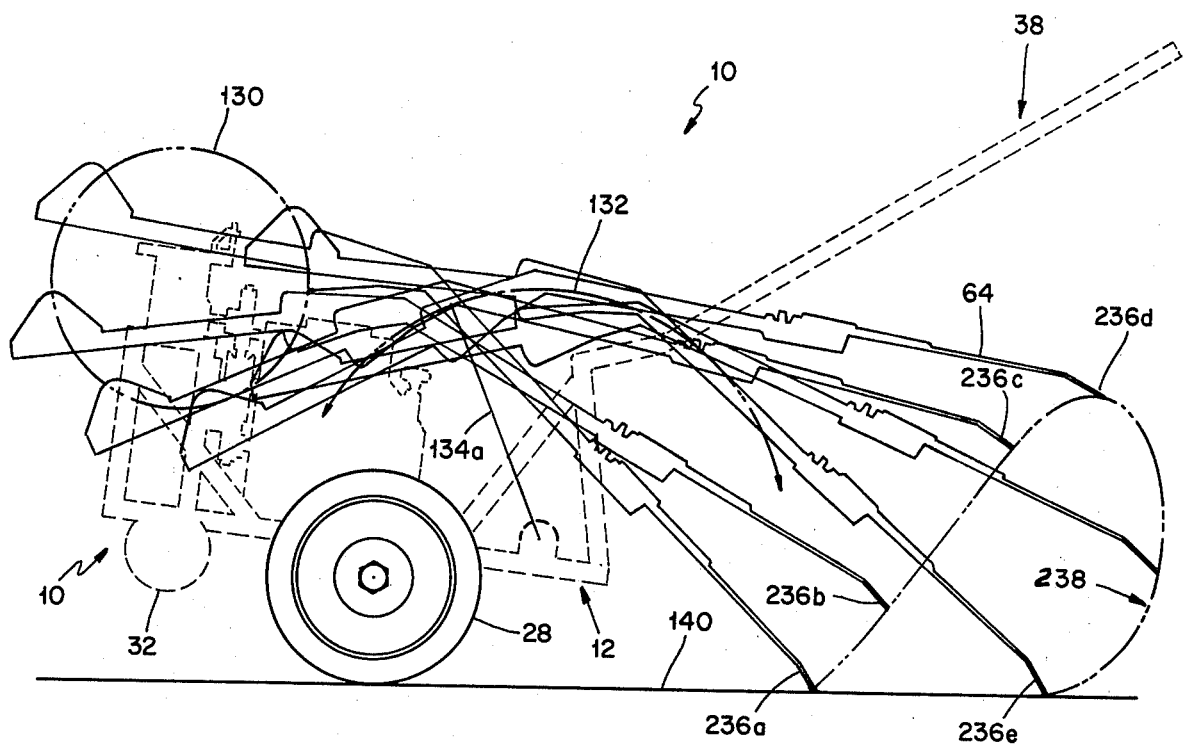
Fig 5
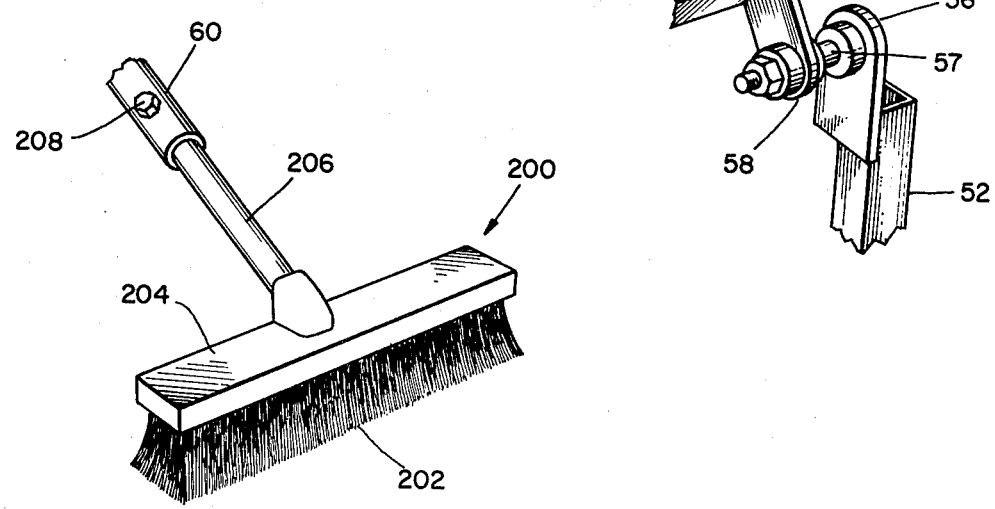
Fig 8
Fig 3

MACHINE FOR RAKING OR SWEEPING

BACKGROUND OF THE INVENTION

1. Field of the Invention

This invention relates generally to sweeping apparatus, and pertains more particularly to a machine for raking lawns or sweeping floors and pavements.

2. Description of the Prior Art

As far as maintaining lawns is concerned, it is most common to use various types of hand rakes. Of course, use of such rakes is time-consuming and requires a considerable amount of manual effort. Hence, there has been a very real need for a mechanized raking device. One form of mechanized raking device is embodied in U.S. Pat. No. 3,824,773, granted July 23, 1974 for "Automatic Rake".

SUMMARY OF THE INVENTION

A general object of my invention is to provide a sweeping machine which will have especial utility as far as raking lawns or sweeping pavements (or floors) is concerned. More specifically, an aim of the invention is to permit various types of sweeping units, such as rakes having flexible tines and brushes having bristles, to be employed so that the surface to be swept can be effectively covered.

Another object of the invention, this pertaining particularly to the raking of lawns, is the provision of a number of lawn rakes that are moved in unison abreast of each other in a path that provides a highly efficient raking action, permitting the accumulation of successive and neatly oriented windrows of leaves, grass and other debris that can later be readily picked up and disposed of.

Another object is to provide a machine of the foregoing character that will cause the sweeping units to move in a path that is highly efficient. More specifically, it is within the purview of the invention to provide a rearward reaching of the units, whether in the form of lawn rakes or brooms, followed by a forward drag imparted thereto, as the machine is pushed across the surface to be swept, the forward dragging movement being followed by an automatic abrupt raising of the units and then a fast lowering thereof for the beginning of the next cycle. It is intended that the mechanized movement of the rakes or other sweeping units be quite rapid with respect to the rate at which the machine is moved across the lawn, thereby producing a large number of raking (or sweeping) strokes during only a small amount of machine advancement across the turf (or floor or pavement).

Yet another object of the invention is to permit the operator to control the size of the windrows of leaves that are being raked. In this regard, all that the operator need do is to tilt the machine forwardly about the axis of the main pair of wheels, thereby raising the rake units with the result that a windrow of leaves is left behind for subsequent picking up.

Still further, an object of the invention is to permit the sweeping action to be terminated at any moment, a clutch mechanism permitting the linkage that actuates the rakes or brooms to be disengaged from the driving means. More specifically, a handle is provided the twisting of which causes a member to bear against the flexible belt and intentionally create enough slippage so that the rake movement is halted at any moment.

The invention also has for an object the provision of a machine that effectively rakes a lawn or sweeps surfaces which is of lightweight construction, permitting the operator to readily move the machine manually across the surface to be swept.

Also, an object is to provide a machine that is relatively inexpensive, thereby encouraging its widespread use.

Another object is to provide a machine of the foregoing character that is very quiet in its operation.

Briefly, my invention involves the provision of a frame having a pair of main wheels supporting it for movement across the surface to be swept. Mounted on the frame is a pair of upwardly extending arms, the lower ends of the arms being pivotally attached or mounted to the frame at the sides thereof. A transversely extending member is pivotally connected to the upper ends of the arms and additional arms extend rearwardly and downwardly from the transverse member, the rearwardly and downwardly extending arms each having a lawn rake or broom attached thereto. Extending forwardly from the transverse member is still another arm which connects with a crank so that the rakes or brooms are dragged forwardly across the lawn or floor, raised and then lowered, this action being repeated many times as the machine is pushed across the lawn or other surface. A belt drive is contemplated with a means for causing the stoppage of the sweeping units at any desired moment. All that the operator need do in order to leave a pile or windrow of leaves or other debris for subsequent picking up is to tilt the machine forwardly about the axis of its main wheels, the same holding true for the dirt that is collected when brushes are substituted for the rakes.

DESCRIPTION OF THE PREFERRED EMBODIMENT

FIG. 3 is an enlarged fragmentary detail in perspective, the view being taken generally in the direction of line 3—3 in FIG. 1;

FIG. 5 depicts a somewhat different path of rake movement from that exemplified in FIG. 4, the path in this figure resulting from pressing downwardly more firmly on the handle with a concomitant much greater flexing of the rake tines than in FIG. 4;

FIG. 8 is a fragmentary perspective view of the lower end of an arm with a bristled broom substituted for a lawn rake.

DESCRIPTION OF THE PREFERRED EMBODIMENT

Figure 1:
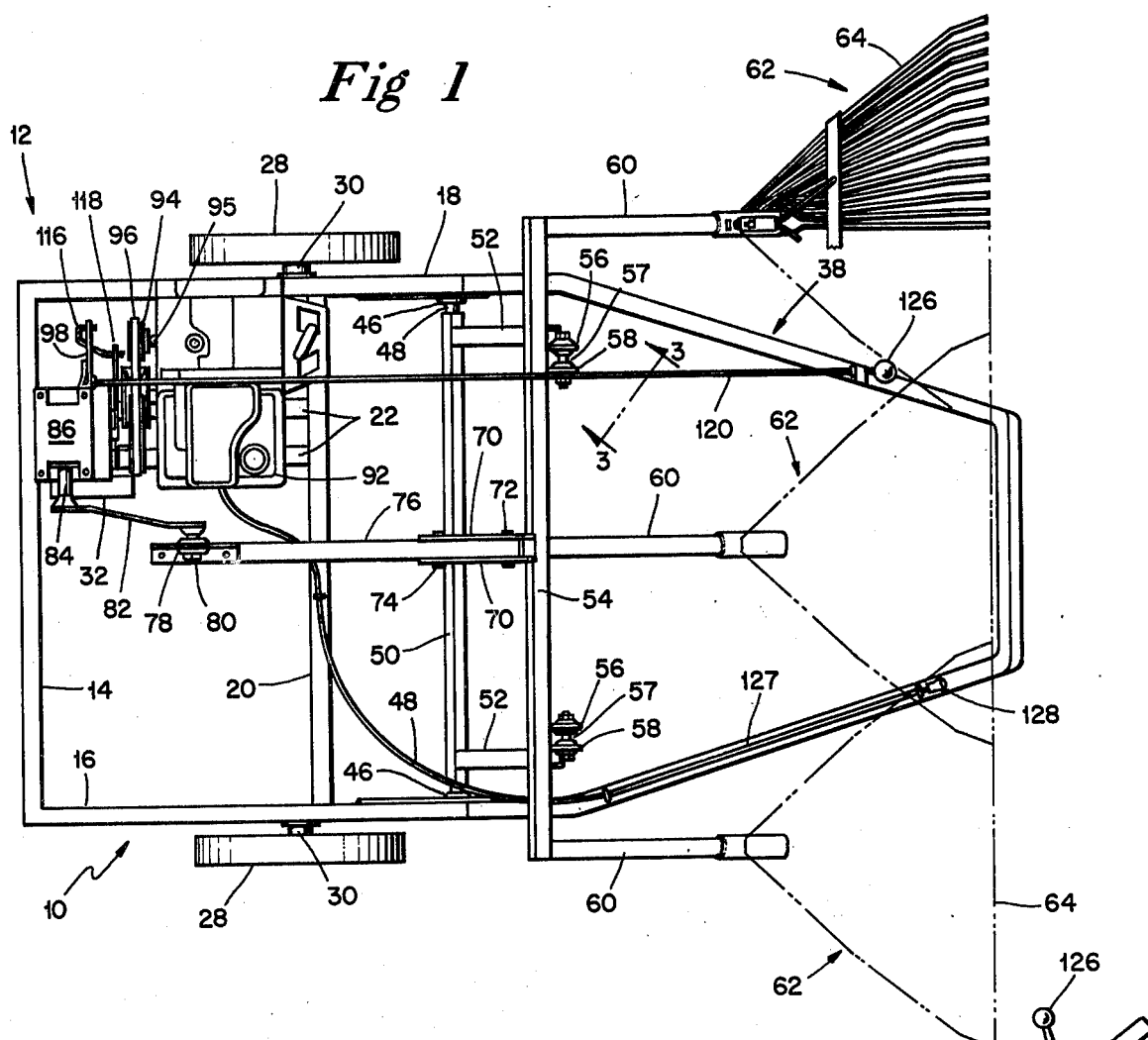
FIG. 1 is a top plan view of a machine exemplifying my invention when equipped with three lawn rakes.

My machine has been denoted generally by the reference numeral 10. As the description progresses, it will be appreciated that the machine 10 will find particular utility in the raking of lawns, but it will also be useful in performing other sweeping actions, such as with bristled brooms, one of which is pictured in FIG. 7.

Describing the machine 10 in detail, it is to be observed that a frame indicated in its entirety by the reference numeral 12 comprises a forward transverse member 14, which is secured, such as by welding, to the forward ends of longitudinal side members 16 and 18. The frame 12 further includes an intermediate transverse member 20. The members constituting the frame 12, that is the members 14–20, can be fabricated from lightweight sheet tubes, preferably having a square cross section. The same cross section can be selected for a pair of struts 22 which connect between the members 14 and 20. Although its purpose is better reserved for subsequent discussion, it can be pointed out at this stage that an elevated platform 24 is provided, the platform 24 having a pair of vertical supporting legs 26a, 26b and a pair of angled legs 27a, 27b which are attached at their lower ends to the frame 12; a portion of the leg 27b is removed in FIGS. 6 and 7 in order to show to better advantage a clutch mechanism hereinafter referred to.

A pair of main wheels 28 having axles or shafts 30 are rotatably attached or mounted to the side members 16 and 18 of the frame 12. An auxiliary wheel 32 of smaller diameter than the main wheels 28 is also provided, the auxiliary wheel 32 having an axle or shaft 34 which is mounted to a lug 36 on one of the struts 22.

At the rear of the frame 12 is a U-shaped handle 38, preferably of circular cross section, which includes integral vertical leg portions 40. The lower ends of the leg portions 40 are attached to the rear ends of the side members 16 and 18. Preferably, a pair of angled braces 44 are employed. In practice, the handle 38 is angularly adjustable. To realize the adjustment, the lower ends of the leg portions 40 and the lower ends of the braces 44 are bolted to the side members 16 and 18, and by providing a number of holes in the upper end portions of the braces 44, the leg portions 40 of the handle 38 can be angularly adjusted which provides for a raising or lowering of the U-shaped handle 38.

Mounted near the rear end of each of the side members 16 and 18 of the frame 12 is a pillow block 46. The pillow blocks 46 can be either bolted or welded in place. The pillow blocks 46 journal therein stub shafts or pivot pins 48 which project from the ends of a lower transverse member 50.

A pair of laterally spaced, upwardly extending arms 52 have their lower ends fixedly secured, as by welding, to the opposite ends of the lower transverse member 50. Owing to the pivotal mounting of the lower ends of the arms 52, it can be appreciated that these arms can be oscillated forwardly and rearwardly about a pivotal axis provided by the pillow blocks 46. An upper transverse member 54, somewhat longer than the lower transverse member 50, has a pair of ears 56 secured thereto. Each ear 56 has a pivot pin 57 passing therethrough which is also engaged with an ear 58 integral with the upper end of each arm 52 (see FIG. 1 and especially FIG. 3).

A trio of rearwardly and downwardly extending arms 60, preferably of circular cross section, have their upper ends fixedly secured at laterally spaced locations to the upper transverse member 54. Each of the arms 60 carries at its free or rearmost end a sweeping unit in the form of a lawn rake 62 comprising a number of flexible tines 64. The lawn rakes 62 are of conventional construction, each having a tubular sleeve or socket 66 which simply slips over the free rear end of an arm 60, a set screw 68 retaining the sleeve 66 in place in each instance.

Whereas the trio of arms 60 extend generally rearwardly, also inclining downwardly from the upper transverse member 54, a bracket comprised of a pair of plates 70 extends forwardly, the bracket plates being spaced somewhat laterally so as to provide an opening therebetween. The bracket plates 70 in practice have their rear edges welded to the upper transverse member 54.

A bolt 72 extends through laterally aligned holes, there being one such hole in each of the plates 70. A second bolt 74 extends through laterally aligned slots 75, there being one such slot 75 in each plate 70. In this way, the rear portion of a forwardly extending arm 76 functioning as a connecting rod is secured to the plates 70 and hence to the member 54 to which the plates 70 are welded. It can be pointed out that the bolts 72 and 74 not only clamp the rear end of the arm 76 between the plates 70, but the aligned slots 75 enable the operator to select the best angle for the connecting rod or arm 76 with respect to the plates 70 and hence with respect to the transverse member 54 (and the arms 60). The forward end of the arm 76 has a pillow block 78 mounted thereon.

The pillow block 78 receives or journals a crank pin 80 carried at the free end of a crank 82. The crank 82 is mounted on a crank shaft 84 projecting from a housing 86 containing therein conventional reduction gears. The gear housing 86 also has a drive shaft 88 with a pulley 90 affixed thereto.

Although an electric motor would be suitable, a gas engine 92 is shown having a pulley 94 on its output or drive shaft 95. A flexible belt 96 is entrained about the two pulleys 90 and 94. A belt tensioning pulley 98 is rotatably carried on a lever arm 100, one end of the lever arm 100 being pivotally mounted by means of a pin 102 to an ear 104 secured to one of the vertical legs 26 supporting the previously-mentioned platform 24.

Although the lever arm 100 rotatable supports the belt tensioning pulley 98, it also supports an L-shaped belt deflector 106, the belt deflector including a shank or leg 108 which is welded directly to the lever arm 100 and which deflector has a horizontal leg at 110 which bears against the belt 96 in order to prevent movement of the belt. When bearing against the belt 96, the belt deflector 106 simply causes the belt to slip relative to the pulleys 90 and 94 which then prevents the crank 82 from rotating in that no force is being transmitted under these conditions from the engine 92 to the gears within the housing 86. Thus, the pivotally mounted deflector 106 functions as a clutch, either disengaging the crank 82 from the engine 92 or coupling the crank thereto.

Figure 6:
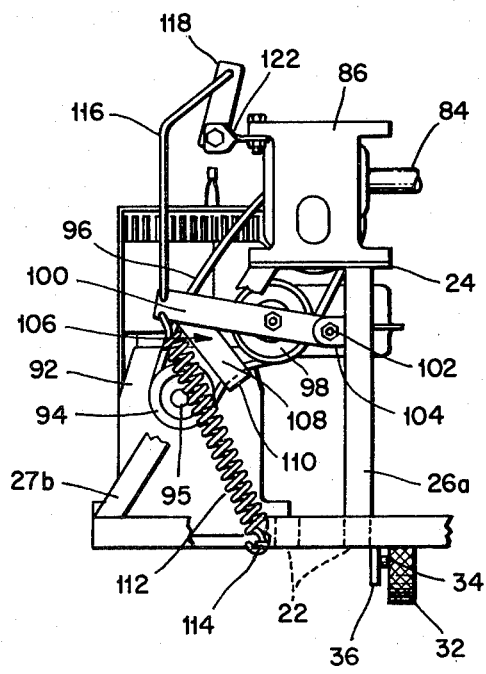
FIG. 6 is a detail view from the front, the view being taken in the direction of line 6—6 of FIGS. 1 and 2 for the purpose of showing the drive means in a declutched condition.
Figure 7:
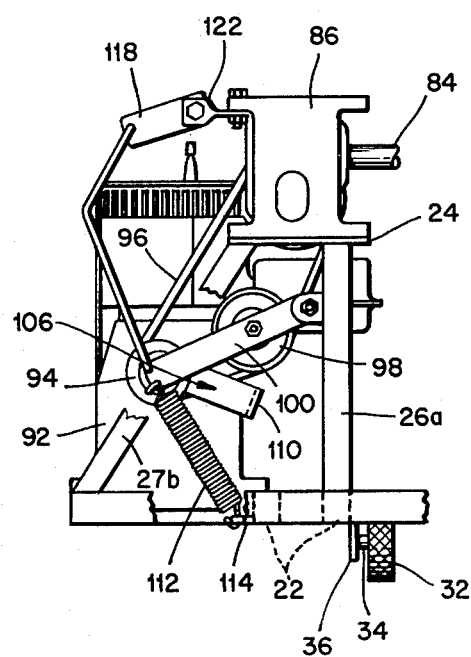
FIG. 7 is a view corresponding to FIG. 6 but with the drive means in a clutched condition.

Whereas FIG. 6 pictures a stopped or declutched action, FIG. 7 illustrates motion being transmitted from the engine 92 to the gears within the housing 86. Attention is directed at this time to a coiled bias spring 112 forming part of the clutch mechanism that is elongated in FIG. 6 and which is contracted in FIG. 7 pulling the lever arm 100 in a counterclockwise direction so as to cause the pulley 98 to remove any slack from the belt 96. Thus, in FIG. 7, the belt is in a sufficiently tight engagement with the pulleys 90 and 94 so as to transmit rotative movement from the pulley 94 to the pulley 90. For the sake of completeness, it can be explained that the other end of the bias spring 112 is attached to an ear 114 extending from one of the previously mentioned struts 22.

In order to overcome the pulling action exerted by the coil spring 112, and thus declutch the engine 92, a link rod 116 having bent ends connects the lever arm 100 to another lever arm 118, the lever arm 118 being fixedly secured to a rather long twist rod 120 which is journaled in a strip member 122 projecting from the gear housing 86. The rod 120 is also journaled in an apertured bracket 124 on the U-shaped handle 38. By means of an actuating handle 126, the rod 120 can be twisted or rotated through approximately 90° to cause the lever arm 118 to move between the upper angular position pictured in FIG. 6 to its lowered angular position depicted in FIG. 7. In other words, the rod 120 actuates the lever arm 118 through a sufficient angle so as to in turn move the lever arm 100 from its position of FIG. 4 in which belt slippage is produced to the position of the lever arm 100 in FIG. 5 in which the belt is tightened sufficiently so that the pulley 94 rotates the pulley 90. The speed of the engine 92 is adjusted via a flexible cable contained in a tube 127, a knob 128 on the projecting end of the cable permitting the throttle on the engine 92 to be manually controlled.

Inasmuch as it is within the purview of the invention to substitute bristled brooms of the so-called barn type for the lawn rakes 62, attention is now directed to FIG. 8 in which such a broom labeled 200 has been shown having conventional bristles 202 projecting downwardly from a wooden block or head 204. The broom 200 is attached to the lower end of the arm 60 shown in FIG. 8 by means of the broom's handle 206, and a set screw 208, a tapped or threaded hole being provided for the accommodation of the screw 208 which bears against the telescopically-received portion of the handle 206.

Operation

Having presented the foregoing description, the manner in which my machine 10 operates should be readily understood. Nonetheless, in order to provide a full appreciation of the benefits to be derived from a practicing of my invention, an operational description will now be given.

Figure 2:
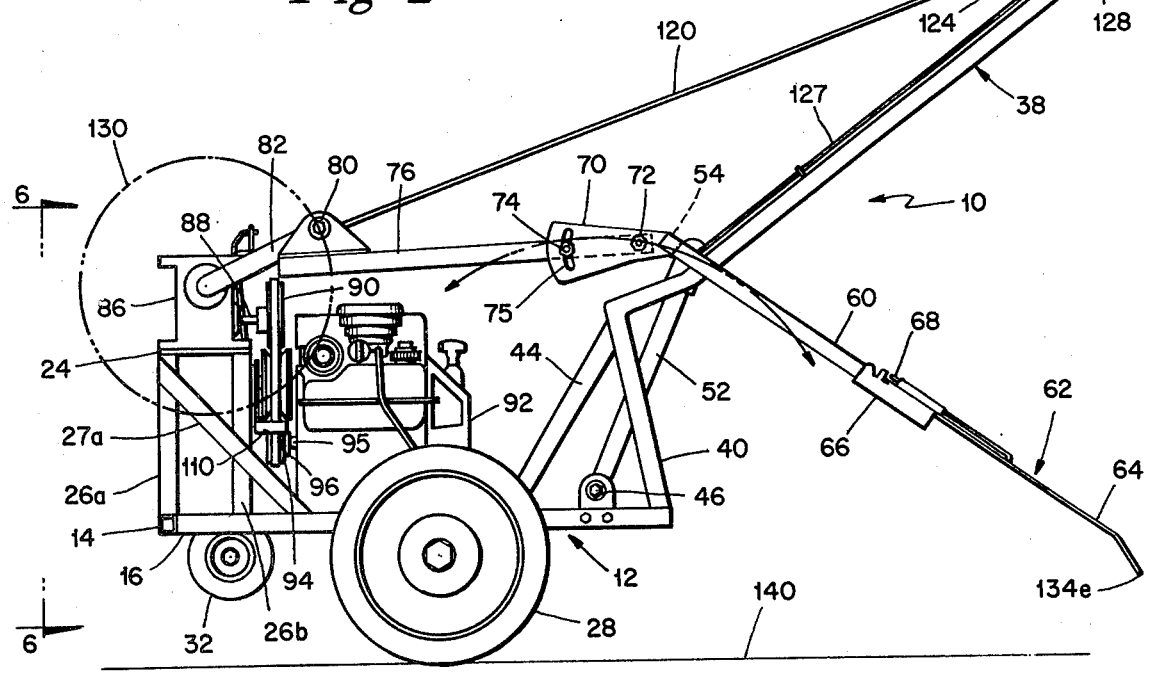
FIG. 2 is a side elevational view corresponding to FIG. 1.
Figure 4:
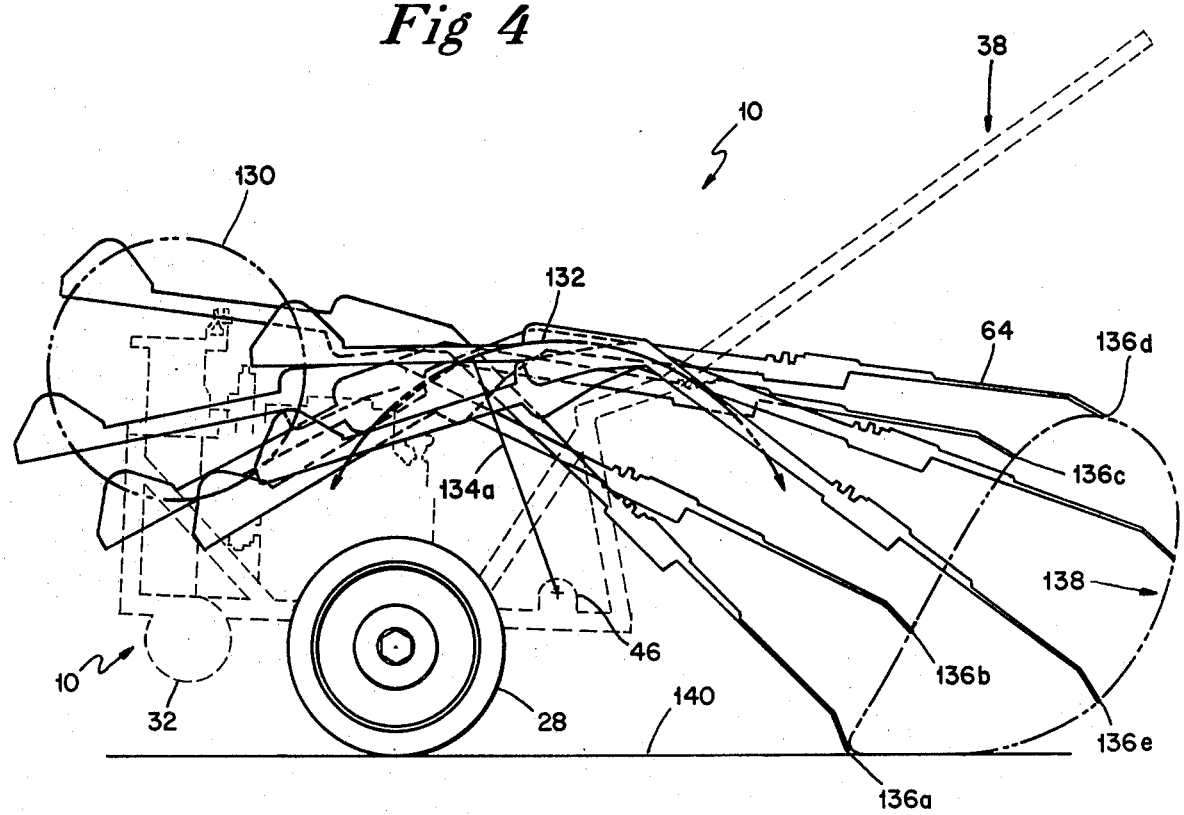
FIG. 4 is a side view generally similar to FIG. 2 but with various positions of the linkage and lawn rakes appearing thereon in order to depict one path of movement imparted to the lawn rakes, the path appearing in phantom outline.

In this regard, it is to be observed that the crank pin 80 traverses a circular path labeled 130 in FIG. 4, the circular path 130 also appearing in FIG. 2. The circular path taken by the crank pin 80 is in a counterclockwise direction. Since the crank pin 80 is connected to the arm 76, which functions as a connecting rod, the crank 82 as it rotates from the rearwardly extending position shown in FIG. 2 to an opposite or forwardly extending position, the arm 76 will pull the upper transverse member 54 from the position in which it is pictured in FIG. 2 to a more forwardly located position, the arcuate path 132 indicating the manner in which the upper transverse member 54 is pulled.

Stated somewhat differently, the shafts or pins 48, together with the pillow blocks 46 in which they are journaled, provide a first horizontal axis about which the arms 52 are oscillated. The pins 57, owing to the fact that they are mounted at the upper ends of the arms 52, provide a shiftable elevated horizontal axis about which the arms 60 are oscillated. The engine 92, the gear means 86 and the crank 82 comprise a power means for effecting oscillation of both sets of arms 52 and 60 about their respective horizontal axes.

The length of the crank 82 determines the stroke or distance through which the upper transverse member 54 is moved or oscillated, and hence the angle through which the two laterally spaced arms 52 are moved, because they are connected through the agency of the pins 58 to the upper transverse member 54. Thus, it will be well to refer to FIG. 4 in which a forward angled position of the arms 52 has been diagrammatically indicated by the numeral 134a. Actually, it will be even more helpful, it is believed, to label the various corresponding positions of the arms 60 carrying the lawn rakes 62 thereon by the reference numerals 136a–136e. Thus, the reference numeral 136a indicates a forward angular position of the arms 60 (produced when the arms 62 have been swung forwardly into the position in 134a), the numeral 136b a position as the arms 60 are being raised, the numeral 136c a more elevated position, the numeral 136d the highest elevation, and the numeral 136e a condition as the arms 60 are moving downwardly, the last-mentioned position corresponding to the solid-line position appearing in FIG. 2.

To enable the viewer to better understand what takes places as far as the movement of the lawn rakes 62 is concerned, one possible path traversed by the tips of the flexible tines 64 has been given the reference numeral 138 in FIG. 4. It will be understood, though, that the path 138 is traversed by the tips of the tines 64 of the rakes 62 when the machine 10 is standing still. Of course, in the performance of a raking action, the machine 10 will be pushed forwardly across the lawn as represented by the ground line 140, relatively slowly, as the tines 64 traverse the path 138. Thus, the forward movement of the machine 10 causes the lawn rakes 32 to be dragged across the lawn, as indicated by the line 140, then immediately raised and then lowered, and the dragging action continuously repeated many times during only a small forward movement of the machine 10.

For the sake of drafting simplicity, FIG. 4 denotes an extremely light raking action, one in which the tines 64 are not noticeably flexed. Nonetheless, it does depict how the raking is achieved. In actual practice the user can control the raking action by tilting the machine 10 in a more clockwise direction than that shown in FIG. 4 (and also in FIG. 2) by merely pressing down or lowering the handle 38. A sufficient lowering of the handle 38 will cause the tips of the tines 64 to engage the turf or ground 140 earlier, as indicated by the numeral 236e in FIG. 5. In other words, the raised position 136e of FIG. 4 becomes the lowered position 236e of FIG. 5. The entire path in FIG. 5 has been indicated generally by the reference numeral 238 which includes the positions 236a–236e. Although the tines 64 are not flexed at position 236e, it should be readily apparent that they are progressively flexed as their tips move forwardly to the position labeled 236a. During the movement from position 236e to position 236a the lawn rakes 62 perform a raking action over a greater distance than that represented in FIG. 4 by the path 138. The location of the bolt 74 in the slots 75 (FIG. 2) enable still other paths to be traversed for a given tilting or racking of my machine 10.

Consequently, any leaves, grass or other debris engaged by the rakes 62 are accumulated in a transverse pile or windrow. The quantity, quite obviously, will depend upon the number of leaves on the ground 140, the speed at which the machine 10 is advanced, and the relative time the tines 64 are in contact with the lawn or ground 140 as determined by the tilt of the machine and/or the position of the bolt 74 in the slots 75.

When the operator sees that a sufficient number of leaves have been collected, then he merely tilts or rocks the machine 10 forwardly about the transverse axis of the main wheels 28, the smaller diameter auxiliary wheel 32 permitting this tilting action to be realized. If the operator chooses to do so, he can stop the raking action by twisting the handle 126 which shifts the lever arm 100 from the position in which it appears in FIG. 7 to that in which it is shown in FIG. 6. In FIG. 6, the belt deflector 106 causes the belt 96 to slip and no force is transmitted to the rakes 62 via the arm 76 because the crank 82 is not at this time rotating. In other words, the engine 92 has been declutched as far as the gears in the housing 86 are concerned.

Particularly as can be seen from FIG. 4, it should be evident that the lawn rakes 62 are moved in a path, that is the path labeled 138, that performs a raking action, for the tines 64 move downwardly from a raised position in a direction that is almost tangent to the surface being swept and then for a short period the forward movement of the machine 10 itself will cause the tips of the tines 64 to be dragged forwardly through a relatively short distance in the performance of the raking action. The path 238 in FIG. 5 is representative of a condition where the tips of the tines 64 are dragged through a relatively long distance as compared with the path 138 in FIG. 4.

If bristled brooms are substituted for the lawn rakes 62, then floors and other surfaces can be swept. In this regard, reference should be made to FIG. 8. It will be understood that the arms 60 have not been changed other than that the lower end of each accommodates a set screw 208. Whereas the tines 64 of the lawn rakes 62 flex or yield, the bristles 202 of each broom 200 flex or yield so that the several brooms 200 (although only one has been shown) traverse a path similar to the paths 138 and 238. Hence, it follows that my machine 10 can find utility in maintaining buildings, parking ramps and other structures as well as in the raking of lawns when equipped with a broom 162 on each arm 60.

Lacking a more descriptive generic term for both rakes and brooms, broad reference to either of these items will be referred to in the claims simply as a "sweeping unit" and the lawn, floor or pavement as the "surface to be swept".

I claim:

1. A machine comprising a frame, wheel means supporting said frame for movement across a surface to be swept, upwardly extending first arm means having lower and upper ends, said first arm means being pivotally mounted on said frame adjacent its lower end for oscillatory movement about a first horizontal axis fixedly located with respect to said frame, downwardly extending second arm means having lower and upper ends, said second arm means being pivotally connected adjacent its upper end to said first arm means adjacent its said upper end for oscillatory movement about an arcuately shiftable second horizontal axis provided by the upper end of said first arm means and at an elevation above said first axis, power means for oscillating said first and second arm means about their said respective first and second axes, and a sweeping unit carried by said second arm means adjacent the lower end thereof, said downwardly extending second arm means extending both downwardly and away from said second axis, whereby said sweeping unit is constrained to be moved upwardly away from said first arm means, then downwardly and then towards said first arm means to perform a sweeping action as said frame is moved across a surface to be swept.

2. A machine in accordance with claim 1 in which said wheel means includes a pair of laterally spaced wheels supporting said frame intermediate the ends thereof.

3. A machine in accordance with claim 2 in which said wheel means includes a third wheel having a smaller diameter than said pair of wheels, said smaller wheel being located nearer the other end of said frame from the end where said first arm means is pivotally mounted.

4. A machine comprising a frame, wheel means supporting said frame for movement across a surface to be swept, first arm means pivotally connected at one end to said frame and extending upwardly from said frame, second arm means having one end connected to said first arm means adjacent the other or upper end of said first arm means and extending angularly in one general direction from said first arm means, a sweeping unit attached to the other end of said second arm means for sweeping said surface as said frame is moved thereacross, third arm means having one end connected to said first arm means adjacent said other or upper end of said first arm means and extending angularly in a second direction from said first arm means that is generally opposite to said one direction of said second arm means, drive means on said frame, and a crank having one end connected to said drive means and its other end pivotally connected to the other end of said third arm means, whereby said drive means causes said crank to rotate and to cause said first arm means to be oscillated to move said sweeping unit across said surface in the direction said frame is moved.

5. A machine in accordance with claim 4 including a transverse member pivotally connected to the upper end of said first arm means, said second arm means and said third arm means being connected to said transverse member.

6. A machine in accordance with claim 5 in which said second arm means is pivotally connected to said transverse member and said third arm means is rigidly connected to said transverse member.

7. A machine in accordance with claim 5 in which said second arm means is pivotally connected to said transverse member and said third arm means is adjustably connected to said transverse member.

8. A machine in accordance with claim 4 including clutch means for disengaging said crank from said drive means.

9. A machine in accordance with claim 8 in which said drive means includes an engine and a gear means, a first pulley associated with said engine and a second pulley associated with said gear means, a flexible belt entrained about said pulleys, and said clutch includes means for engaging said belt to cause slippage between said pulleys in order to inactivate the rotation of said crank.

10. A machine in accordance with claim 9 in which said clutch means includes a belt tensioning pulley, spring means normally biasing said belt tensioning pulley in a direction to cause said belt to engage said first and second pulleys, a belt deflecting member, and manually operated means for overcoming the biasing action of said coil spring to cause said belt deflecting member to produce slippage of said belt.

* * * * *